United States Patent

Arvanitakis

[15] 3,705,649

[45] Dec. 12, 1972

[54] DESLUDGER APPARATUS AND PROCESS

[72] Inventor: Kostas Savas Arvanitakis, 7031 W. 63rd, Chicago, Ill. 60638

[22] Filed: March 30, 1972

[21] Appl. No.: 239,630

Related U.S. Application Data

[63] Continuation-in-part of Ser. No. 173,778, Aug. 23, 1971.

[52] U.S. Cl. ................... 210/66, 100/93 S, 100/126, 202/152
[51] Int. Cl. .............................................. B01d 37/00
[58] Field of Search ......... 100/93 S, 126; 210/66, 68, 210/73, 75, 106, 108, 167, 179, 188, 195, 259, 415

[56] References Cited

UNITED STATES PATENTS

| | | | |
|---|---|---|---|
| 3,497,452 | 2/1970 | Arvanitakis | 210/73 X |
| 2,893,925 | 7/1959 | Victor | 210/68 |
| 3,352,763 | 11/1967 | Shields | 210/167 X |
| 3,135,193 | 6/1964 | Hunt | 210/415 X |
| 3,230,865 | 1/1966 | Hibbel et al. | 210/415 X |
| 1,709,349 | 4/1929 | Hollstein | 100/93 S |

FOREIGN PATENTS OR APPLICATIONS

| | | | |
|---|---|---|---|
| 159,525 | 3/1921 | Great Britain | 100/93 S |

Primary Examiner—Samih N. Zaharna
Attorney—August E. Roehrig, Jr. et al.

[57] ABSTRACT

Method of and apparatus for collecting and removing contaminants from a filtration system by passing unclarified contaminant bearing liquid through a filter apparatus to collect the contaminants thereon and discharge the liquid clarified thereby. At a predetermined time, the discharge from the filtration system to the filter apparatus is interrupted and the contaminants removed from the filter apparatus to the unclarified liquid whereat they are collected and conveyed out of the apparatus. The collected contaminants are partially solidified by exposure to heat and conveyed from the system for disposal.

29 Claims, 7 Drawing Figures

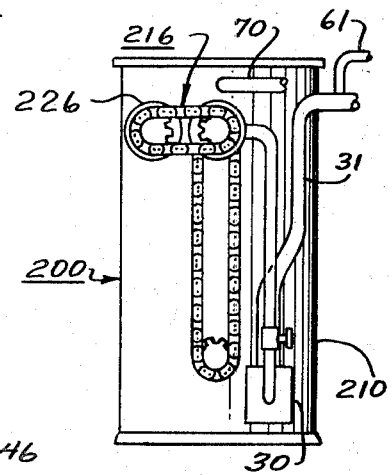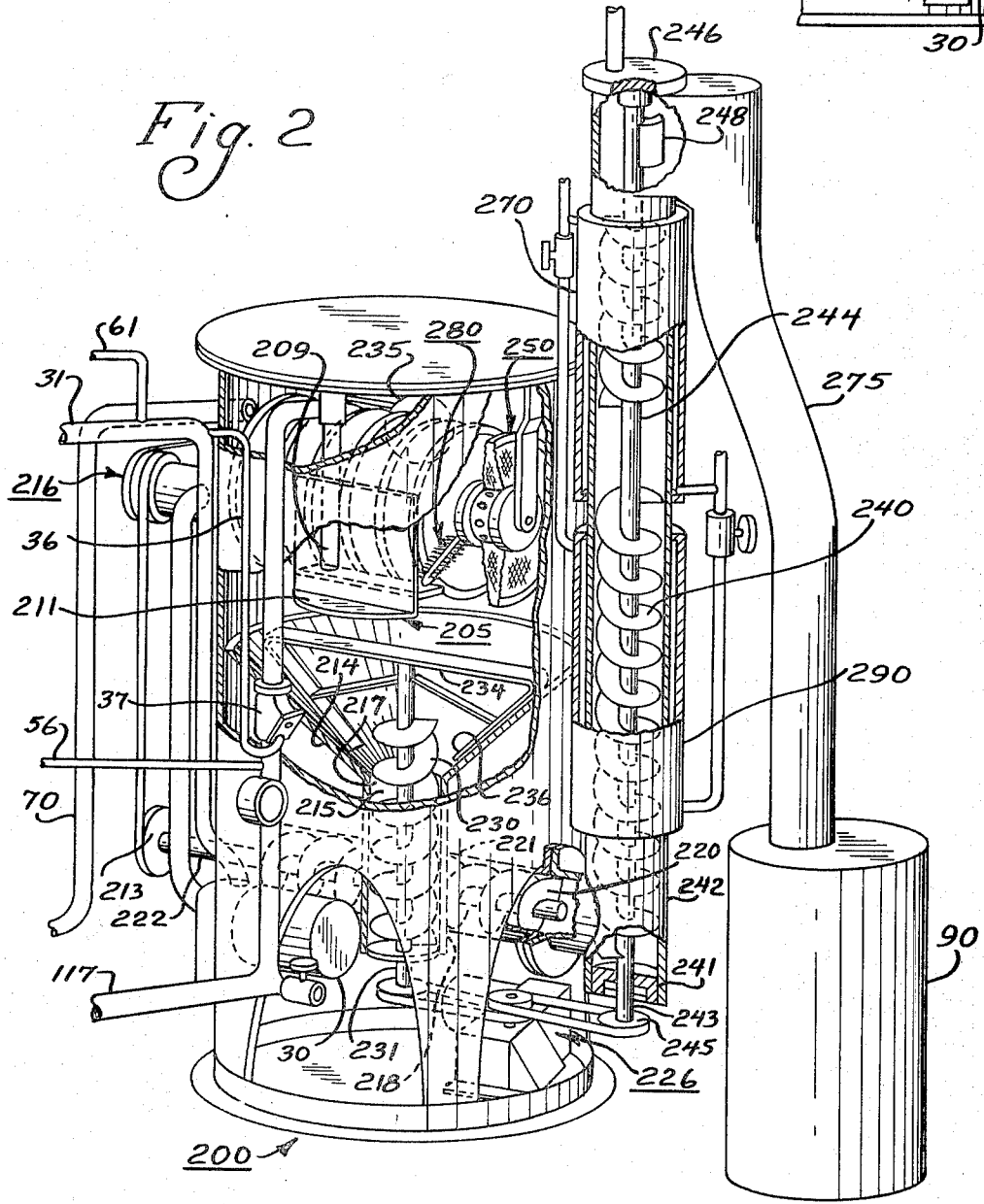

DESLUDGER APPARATUS AND PROCESS

This application is a continuation-in-part of my earlier application Ser. No. 173,778 filed Aug. 23, 1971, entitled "DESLUDGER APPARATUS".

BACKGROUND OF THE INVENTION

This invention relates to a method of and apparatus for disposing of expended materials and collected contaminants removed from an unclarified liquid by filtration system, and in particular, to a desludging system for removing contaminants and expended filter media from a primary filter system by passing these materials through a filter, and removing the collected material from the filter at a predetermined time for disposal.

More specifically, this invention relates to a desludging method and apparatus especially useful with a primary filtration system whereby unclarified fluid and expended filter media from the primary filtration system may be passed into the desludger chamber to clarify the liquid passed therethrough removing the contaminants and expended filter media from the fluid and returning the liquid for further use. The input of contaminant bearing fluid from the primary filtration system is interrupted, and the contaminants and expended filter media retained by the desludger filter means are removed, collected, and conveyed through a heating station whereat a sufficient amount of liquid is vaporized from the sludge to facilitate the disposal thereof.

Filtration systems for clarifying liquid are used in many applications wherein it is desired to remove solid and chemical contaminants from a liquid prior to discharging the liquid, for example into sewers. Certain applications (closed systems) necessitate for environmental pollution control that the liquid be clarified by a filtration system in order that it be continuously re-used without discharge into sewage lines and/or subjected to a costly method of disposal. Such a closed filtration system is used in many applications wherein the cost of the liquid clarified is such that it would be uneconomical to finally dispose of the liquid, or the liquid is of such a nature that final disposal costs require it to be utilized for many cycles prior to being expended.

In other types of applications (open systems) it is necessary for environmental pollution control requirements that contaminants dissolved or suspended in the liquid be removed therefrom prior to discharging the liquid for final disposal. The contaminant material, therefore, must be collected for disposal in the most economical and efficient manner.

Filtration systems used to clarify liquids remove the solid particles and chemical contaminants by passing the unclarified liquid through a mechanically and chemically acting filter apparatus. The mechanical action of the filter physically screens or removes the solid contaminants from the unclarified liquid and the chemically active portion of the filter removes dissolved chemical contaminants through adsorption. However, as the contaminants are removed from the liquid they accumulate on the surface of the filter inhibiting the flow of the liquid therethrough eventually clogging the filter openings and necessitating the removal of the filter media or filter cake from the filter support or septum. When the filter cake has accumulated to a level whereat the clarifying of the liquid is impaired, the cake must be removed requiring that the filtration process be interrupted. Filter cleaning means such as brushes, scrapers and/or sprayers are used to mechanically clean the filter cake from the filter septum or screen. Also, filter cake may be removed from the septum by backwashing which is achieved by reversing the normal flow of the filtrate through the filter. The result of removing the filter cake from the filter septum is a dislodging of the filter media which settles in the surrounding liquid and must be removed therefrom in order to continue the operation of the filtration system.

In certain prior art devices, the suspended and dissolved contaminants in the fluid are pumped to a secondary filter chamber wherein the contaminants are removed from the liquid and the liquid is returned to the system for re-use. After a period of time in which the contaminants are collected in the secondary filter chamber, they must be removed to continue operation. In some systems, the solid contaminants in suspension in the liquid are caused to settle to the bottom of the chamber through gravity. These contaminants are then removed through a screen or may be passed through a disposable filter which is discarded. However, both of these systems require a substantial time period to accomplish the removal of the contaminants or sludge and, therefore, do not provide for efficient operation.

In other prior art systems, the contaminants, both solid contaminants suspended within the liquid and the dissolved contaminants, are collected onto a filter cake which upon becoming expended is removed from the septum in a manner to minimize the formation of a small particle suspension. Therefore, these portions settle to the bottom of the chamber more quickly and may be removed by draining the secondary filter chamber and removing the contaminants to the bottom thereof.

In the utilization of these previously described prior art mechanisms for collecting sludge from a filtration system, time-consuming and inefficient processes are involved. Therefore, none of these devices are suitable for commercially successful use in general pollution control/filtration system contaminant disposal applications. Furthermore, none of these systems provide an efficient economical method or apparatus for treating the collected sludge to facilitate disposal.

SUMMARY OF THE INVENTION

It is, therefore, an object of this invention to improve the method of and apparatus for collecting and disposal of sludge accumulated in pollution control/filtration systems.

Another object of this invention is to collect and dispose of sludge from a filtration system in an efficient and economical manner.

Still another object of this invention is to improve pollution control/filtration systems sludge disposal by filtering the sludge containing liquid from a primary filtration system removing the sludge therefrom, collecting the sludge upon the accumulation of a predetermined amount and heating the collected sludge to vaporize a portion of any liquid collected therewith.

These and other objects are attained in accordance with the present invention wherein there is provided a method of and apparatus for receiving unclarified liquid bearing suspended and dissolved contaminants and expended filter media from a primary filtration system, collecting the contaminants and expended filter media, or sludge, and conveying these materials through a heating station whereat the sludge is exposed to heat to remove a portion of liquid collected therewith, to facilitate economical and efficient disposal of these materials.

DESCRIPTION OF THE DRAWINGS

Further objects of this invention, together with additional features contributing thereto and advantages accrueing therefrom, will be apparent from the following description of one embodiment of the invention when read in conjunction with the accompanying drawings, wherein:

FIG. 2 is a frontal perspective view of the desludger apparatus to better illustrate the components thereof for collecting and disposing of the transferred sludge;

FIG. 5 is a partial rear elevation of the desludger apparatus to better illustrate the coupling of the apparatus to a filtration system;

DESCRIPTION OF A PREFERRED EMBODIMENT

Figure 1:
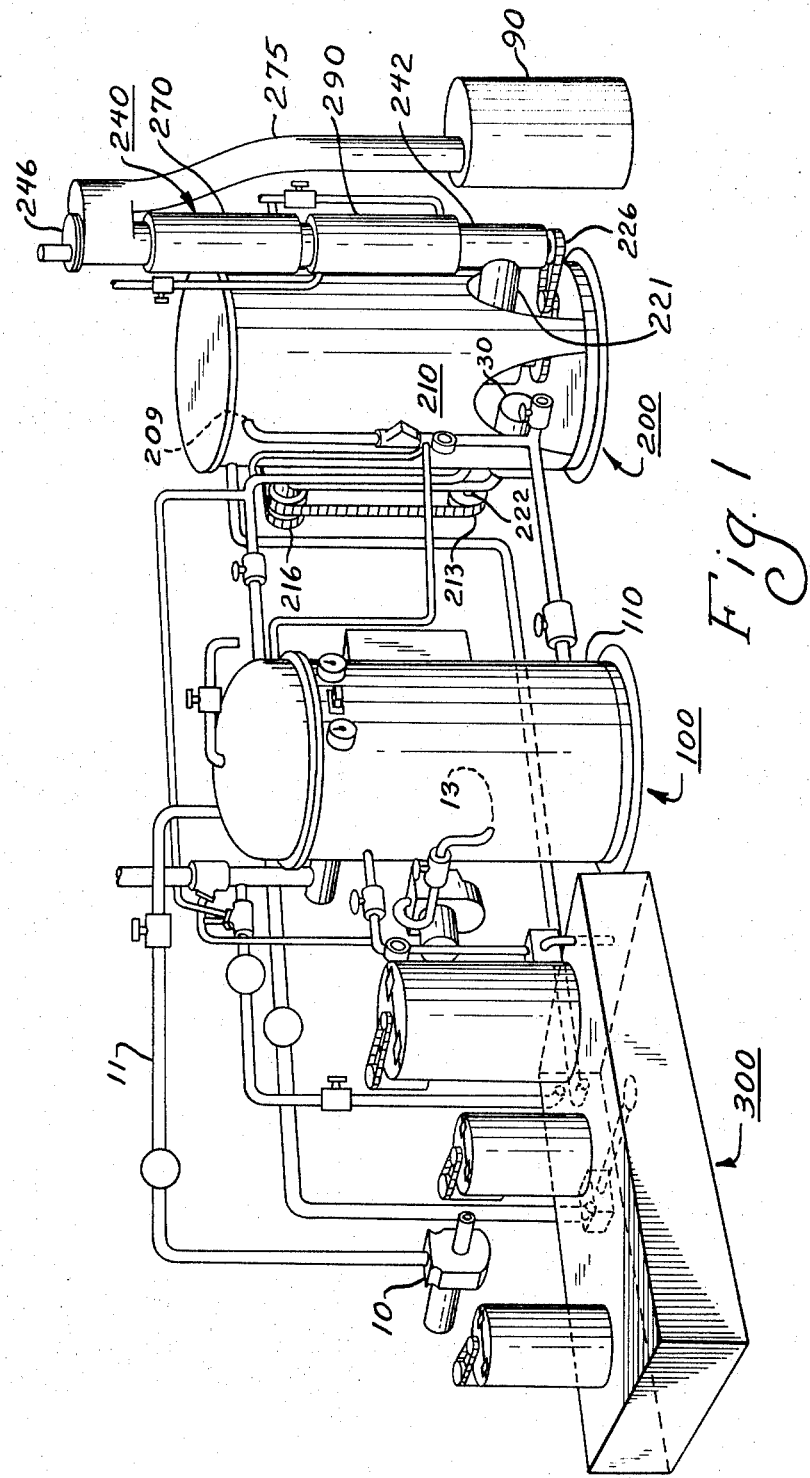
FIG. 1 is a perspective view of a filtration system utilizing the invention to remove and dispose of sludge transferred from the primary filter apparatus.
Figure 4:
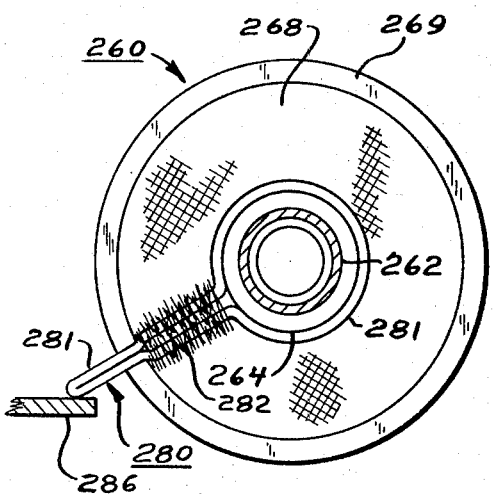
FIG. 4 is a section view of the filters shown in FIG. 3 taken along lines 4—4 to better illustrate the means for removing the accumulated contaminants from the filter surface and the means for forwarding the clarified fluid from the desludger.
Figure 3:
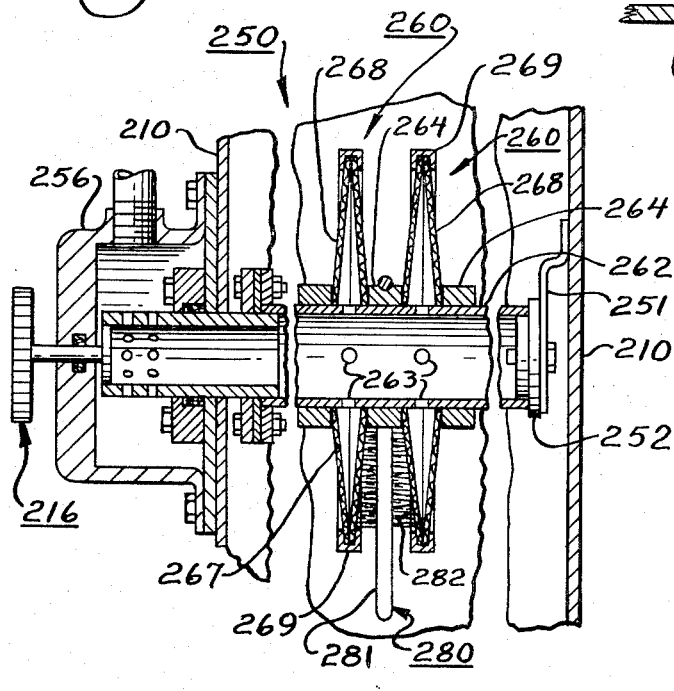
FIG. 3 is an end view of the filter elements utilized to collect the suspended and dissolved contaminants and the expended filter media from the filtration apparatus.

Referring now to FIG. 1, there is shown a pollution control/filtration system utilizing the subject matter of this invention. The filtration system illustrated in FIG. 1 may be any commercially available filtration system wherein sludge such as suspended and dissolved contaminants in the unclarified liquid and expended filter aid media, are removed from the filtration system. These materials may be removed from the filtration system and transferred directly to the desludger or indirectly as by first passing into a settling tank or pit, not shown. However, the filtration system illustrated by FIG. 1 is especially suitable for use with the instant invention, and the details thereof are disclosed in co-pending application FILTRATION SYSTEM, Ser. No. 173,777 filed concurrently herewith in the name of K. S. Arvanitakis and reference is made thereto for details of the filtration-pollution control system disclosed therein.

The filtration system referred to above includes a primary filtering mechanism 100, a secondary filtering mechanism or desludger 200 and a pre-coating apparatus 300. Unclarified liquid is drawn into a main pump 10, and pumped through the discharge line 11 into the inlet 13 of the primary filter mechanism 100. The unclarified liquid entering into the primary filter apparatus 100 is clarified by means of a filtration or filter system and passes out from the filter chamber 110 through an outlet to be re-cycled, disposed of, or to be passed to the pre-coat system 300 in a manner disclosed in the aforementioned co-pending application. As the unclarified liquid flows through the filter elements of the primary filter apparatus 100, the suspended and dissolved contaminants are retained on the filter element cake restricting the passage of the liquid therethrough gradually increasing the pressure required to force the liquid through the filters. As the pressure increases, it becomes necessary to remove the contaminant bearing filter cake from the filter element for further continued operation of the filtration system.

Upon the filter cake becoming expended through clarifying the contaminanted liquid by removing the solids and chemical contaminants therefrom, the filter cake is removed from the filter septum forming a suspension in the unclarified liquid contained in the primary filter chamber 110. The contents of the primary filter chamber are withdrawn by means of a vacuum pump 30 into the desludger apparatus 200 wherein the expended filter cake and contaminants are collected fro disposal.

The unclarified fluid bearing the suspended filter cake and contaminants from the filtration apparatus is withdrawn into the desludger 200 through the operation of a vacuum-type pump 30, drawing the fluid into the pump and discharging it into the desludger 200 through inlet 209. The fluid is discharged into a turbulence suppressor 205, formed as a pocket defined by the desludger chamber 210 and plates 211, to minimize the turbulence of the fluid entering the desludger apparatus.

The fluid draw in into the desludger apparatus is passed through filter elements 260 of the filter mechanism 250 within the desludger chamber. The filter mechanism 250 includes a hollow filter tube 262 rotatably mounted in a filter bracket 251 secured to the desludger chamber 210 and in a sealed bearing housing 256 at its other end. The filter tube 262 is closed at both ends and has perforations 263 formed therein. The filter elements 260 are mounted co-axially on filter tube 262 and separated by a plurality of spacers 264 such that the perforations 263 formed in the filter tube 262 are in communication with the interior of the filter disc 260.

Each filter element 260 comprises a support structure or spacer 267 covered with a fine mesh screen or septum 268. Support structure 267 is a flat sheet of material folded in an accordion-like fold radiating outward from the center of the elements and tapering to a point at the outer edge. The fine mesh screen or septum 268 covering the support structure 267 is of a mesh size such that all solid particles suspended in the liquid of a size approximately 47 microns or larger are retained when the fluid is pumped through the filter elements. However, the particular mesh size of the septum 268 is dependent upon the nature of the suspended material and the type of filter forming material. The outer periphery of each of the filter elements 260 has a metallic rim 269 fixed thereon that slightly overlaps the screen or septum and seals the outer periphery of the filter elements.

A plurality of wipers 280 are positioned between the filter elements 260 to clean the surface thereof. The wipers 280 are each supported on a spacer 264 separating the individual faces of the filter element of the desludger filter discs 260 so that each wiper is in contact with the opposing face of two adjacent filter elements. When the filter elements 260 are rotated relative to the wipers 280, the relative motion between the wipers and the filter elements 260 will cause the entire surface of the filter element to be subjected to the wiping action of the brush fibers 282.

Each of the wipers 280 includes an arm 281 to which a plurality of brush fibers 282 are appropriately secured. The wiper arm 281 extends radially outward from the filter tube 262 and about the spacer element 264 for support thereby. An arm stop 286 appropriately secured to the walls of the desludger chamber 210 prevents rotational movement of the wiper when the filter shaft 252 is actuated rotating the filter elements 260. Therefore, the wipers 280 will remain stationary and the brush fibers 282 will contact the entire surface of the filter element 260 when the elements are rotated due to the activation of desludger filter drive mechanism 216.

After the contents of the primary filter chamber 110 have been withdrawn into the desludger 200 and recirculated through the filter elements 260 removing all of the suspended and dissolved contaminants as well as the expended filter cake onto the filter elements, the desludger unit is isolated from the primary filter system through activation of suitable valving in the common fluid lines connecting the two units. The desludger filter drive mechanism 216 is activated rotating the filter elements against the wipers 280 removing all the accumulations from the filters 260 which settle to the bottom of the desludger chamber 210.

The drive mechanism 216 is also connected to a horizontal auger 220 positioned within the desludger chamber 210. When the drive mechanism 216 is activated, a drive motor 226 is activated rotating center auger 230, cone scraper 234 and vertical auger 240.

As best shown in FIG. 2, the bottom of desludger chamber 210 is formed in a conical shape (214) and sealed to prevent liquid from passing out of the chamber except through the bottom outlet 215. The center auger 230 is positioned within the outlet of the conical shaped bottom of the desludger chamber 210 and is rotatably supported therein with a portion of the shaft 231 extending outwardly from the water-tight end closure of the outlet 218 with a gear suitably secured thereto to form a portion of the vertical auger drive 226. The opposite end of the shaft 231 is connected to a horizontally extending bar of the cone scraper 234 which has downwardly turned ends extending substantially parallel to the conical shaped bottom 214.

The cone scraper 234 functions to eliminate sludge bridging or accumulation in the cone. The sludge material removed from the filter septum of the filter elements 260 sometimes has a tendency to accumulate at the cone and the knife edge or downwardly extending portion 236 functions to prevent accumulation of sludge on the cone walls.

The left-handed center auger 230 forces the sludge downward to the opening 217 in the bottom cone outlet whereat the sludge passes into the horizontal auger 220. The horizontal auger 220 is rotatably journaled within a tube 221 having one end enclosed and the other end in communication with the inlet to vertical auger 240. A portion of the auger shaft 222 extends outward of the closed end and is sealed to prevent the passing of material from the tube. The extending end of the shaft 222 is connected to a driven gear 213 which forms a portion of the combined drive mechanism 216.

As the sludge is fed downwards through the center auger 230 and into the horizontal auger 220 it is conveyed therefrom into the vertical auger 240. The vertical auger 240 is rotatably journaled in an end cap 241 which forms a fluid-tight enclosure of the column 242 in which the auger is positioned. A portion of the shaft 243 extends outward of the end cap and has a driven gear 245 secured thereto forming a portion of the vertical auger drive system 226. The column 242 is suitably secured to the outer portion of the desludger chamber 210 by brackets. The upper end of the column 242 is closed by a cap 246 having a bearing portion for receiving the uppermost end of the vertical auger shaft 243. The cap 246 is formed with a vent to allow vapors passing upward in the vertical auger to be suitably treated or released to the atmosphere depending upon the nature of the vapor material.

As sludge is fed into the vertical auger 240 by means of the horizontal auger 220, it is elevated through the auger flite and heated by means of steam jackets as shown or by any other suitable means such as an electrical resistance heater system. As shown in FIG. 2, two steam jackets 270 and 290 are carried by the column 242 and connected by valve supply and return lines such that either one or the other or both of the steam jackets may be utilized depending upon the nature of the sludge material passing upward in the column and the type of reclamation (semi-dry or dry discharge) which is desired. It has been found that heating of the vertical auger is necessary due to the mechanical action of the augers on the sludge, even if the sludge is at a very hard state. The action of the augers on the sludge, if the column is not heated, will mechanically work the material such that the sludge cannot be elevated by the auger, especially at very low speeds. Therefore, the heating of the auger evaporates excessive liquids to maintain the sludge in a state to be elevated. The vertical auger 240 has a portion 244 void of any auger flite. In this manner, sludge being elevated by the auger forms a solid mass or plug at this portion preventing any excess liquid from flowing upward seeking its level relative to the fluid level within the desludger chamber 210. As shown (FIG. 2), the lower steam jacket 290 extends upwardly from below the outlet 217 of the conical bottom 214 and the upper steam jacket 270 extends above the top of the desludger chamber 210.

The heat from lower steam jacket 290 causes the liquid-solid material below the sludge plug to boil vaporizing the liquid within this portion of the column 242, and eventually draining the contents from the desludger chamber 210 due to this boiling process. The upper steam jacket 270 functions to control the amount of moisture retained in the sludge after the sludge plug is formed (at 244) and elevated by vertical auger 240 through the portion of column 242 adjacent steam jacket 290. By controlling the heat applied through steam jacket 270, the sludge can be expelled in varying states of dryness.

For best results the operation of the vertical auger 240 should be intermittent such that the heat will have an opportunity to dry the sludge over an extended period of time as it is sequentially elevated. When the sludge reaches the top of the vertical auger, a deflector guide 248 secured to the top portion of shaft 243 and rotatable therewith directs the sludge out from the column into the dry sludge chute 275 whereat it is discharged into a suitable receptacle 90 for disposal.

Upon initial start up or when sludge is not present within the vertical auger column 242, it is preferable to add a quantity of filter aid medium into the column to form an initial plug at portion 244 of auger 240. In this manner, a plug of material will be present to facilitate sludge removal. While FIG. 2 illustrates one void (244) in auger 240, it is sometimes preferable that two, three or more void portions be formed depending upon the specific application in which the desludger apparatus is utilized.

The sludge plug formed at the auger void functions to squeeze or press the liquid from the solids as additional sludge is conveyed upwardly against the bottom of the plug elevating the sludge at the topmost portion of the plug thereby squeezing the liquid therefrom. In those applications wherein the vertical auger has two or more void portions to form sludge plugs, the lower plugs act as a series of filters removing suspended solids from the liquid passing therethrough. The passage of liquid through the lower plugs will depend upon the position of the void created plug and, therefore, the pressure head exerted thereagainst due to the liquid level within the desludger chamber 210. As the liquid level within the desludger chamber 210 decreases, the lower filter-acting plugs will function as the upper plug, removing the liquid from the sludge by the pressing or squeezing action exerted by the sludge beneath the plug.

Figure 6:
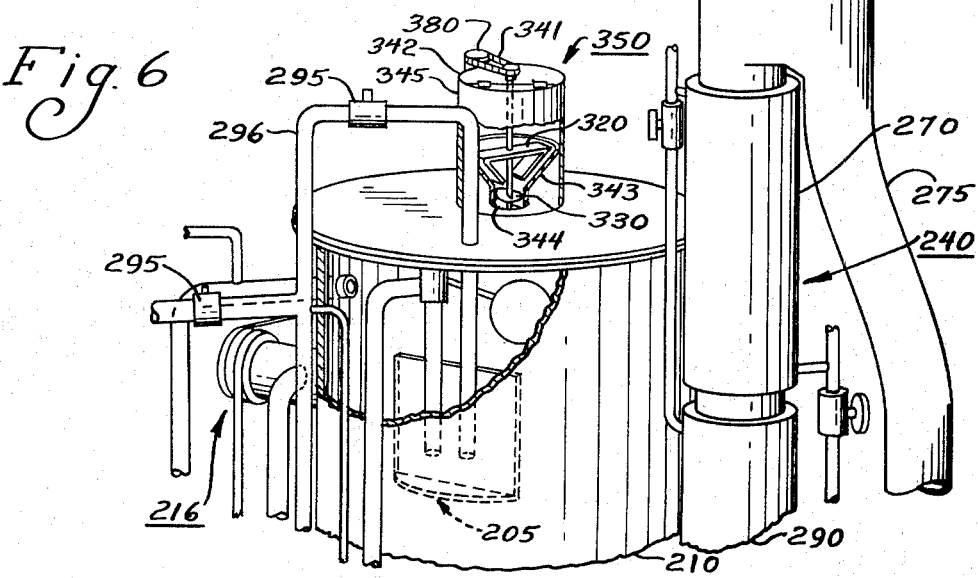
FIG. 6 is a partial perspective view of an alternative embodiment of the invention.

Referring now to the alternative embodiment of FIG. 6, the desludger 200 shown therein is the same as that previously described, but further includes a filter aid hopper 350 carried on the top of the desludger chamber 210. A drive mechanism 380 is secured to the filter aid hopper 350 and connected by suitable drive couplings to rotate a shaft 341 extending longitudinally within the feeder hopper and having secured thereto an agitator 320 and feed auger 330. The bottom of the hopper is formed in a conical shape 343 and secured within the hopper chamber 345 to prevent any of the material contained therein from being discharged except through the outlet 344 in the bottom of the cone. The shaft 341 is suitably journaled for rotation in a bracket secured to the walls of the filter aid hopper on the bottom, and in the top closure 342 of the hopper. A portion of the top closure is hinged so that it may be opened to replenish the filter aid material as necessary.

When the feeder drive motors 380 are energized, due to the gearing and pitch of the feed auger 330, a controlled pre-measured amount of filter aid or media is added into the desludger chamber 210 to be mixed with the unclarified liquid passed thereinto from the primary filter system.

Depending upon the type of contaminants passing into the desludger 200, it is sometimes desireable to add filter aid material to these contaminants to aid in forming the filter cake on the septum of filter elements 250, or to neutralize a particular chemical characteristic of the unclarified liquid.

In this particular embodiment, a valved (295) line 296 is added to recirculate the contents of the desludger chamber, discharging the recirculation into the turbulence suppressor 205 and forming the filter cake on the filter elements 250.

Figure 7:
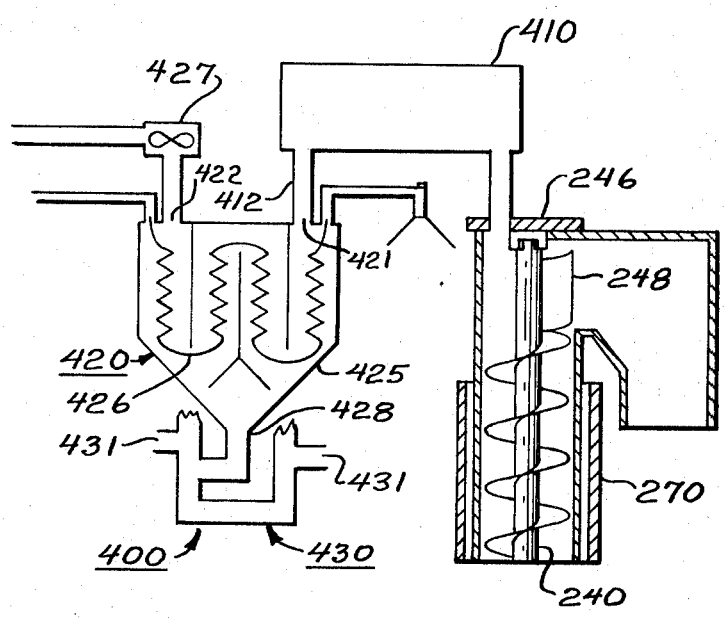
FIG. 7 is a partial view of the desludger apparatus to show another alternative embodiment thereof.

Referring now to FIG. 7, there is shown a portion of the desludger 200 having a vapor recovery system 400 connected to the vertical auger end cap 246 for receiving the vapors passing from the vent formed therein. In certain applications, for example where the unclarified liquid is a solvent or the contaminants are of such a nature that upon heating the sludge as it passes upwardly in the vertical auger 240 decomposition occurs creating a vapor, it is desireable to recover certain components of the vapor which pass through the end cap vent. The recovery of such vapor, or components thereof, may be necessary due to ecological or economical factors. In addition, it may be desireable to recover materials carried by the vapor.

When solid particles or materials carried by the vapor are to be recovered, a powder trap chamber 410 is connected to the end cap 246. The powder trap chamber encloses a filter unit for collecting solid particles carried by the vapors and mechanically separates these particles from the vapor for reclamation or disposal.

A condenser unit 420 is connected to the outlet 412 of the powder trap chamber 410 to receive the vapors passed therethrough. While FIG. 7 discloses that the powder trap 410 is interposed between the vent cap 246 and the condenser 420, in certain applications wherein the vapor does not contain solid particles, the condenser is connected directly to the end cap and the powder trap chamber eliminated. The condenser unit 420 receives the vapors through an inlet port 421. The vapors are passed through a multi-partitioned condenser chamber 425 having a coil 426 therein through which passes a heat exchange medium. While various liquids may be passed through the coil to condense the vapors, it has been found that cold water is suitable for most applications.

The vapors are drawn through the chamber 425 by means of an exhaust fan or blower 427, carried at the outlet port 422, which vents the condenser exhaust from the recovery system. As the heated vapor passes through the condenser chamber 425 and contacts the coil 426, the vapor is condensed on the outer surface of the coil and flows out through the bottom 428 of the chamber into a liquid separator 430. Depending upon the nature of the condensate, the separator functions to remove the condensate in accordance with the specific gravity of the liquid. The condensate settles in the bottom of the separator 430 and, depending upon the particular type of condensate, any immiscible liquids will separate in accordance with their respective specific gravities and pass out of the separator through outlets 431 which are spaced vertically from one another.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that this invention not be limited to the particular embodiment disclosed as the best mode contemplated for carrying out this invention, but that the invention will include all embodiments falling within the scope of the appended claims.

What is claimed is:

1. A method for removing and disposing of contaminants and expended filter material from a filtration system comprising the steps of passing contaminated liquid bearing expended filter material from a filtration system through filter means to collect the contaminants and expended filter material thereby clarifying the liquid passed therethrough, interrupting the passing of liquid from the filtration system upon the collecting of the contaminants and expended filter material by the filter means, removing the collected materials from the filter means and gravitationally accumulating the materials so removed, conveying the accumulated materials from the filter means to a vertically disposed auger means which is in direct communication with the filter means, the materials entering the auger adjacent the bottom thereof, heating said materials in said auger means to vaporize at least a portion of the liquid in said materials, the portion of liquid remaining in said materials being sufficiently small so that the materials can be elevated by the auger means at relatively slow speeds of rotation of said auger means, a portion of the flight of the auger means being removed at at least one position spaced from the bottom thereof, elevating the heated materials in said auger means while allowing liquid therein to drain by gravity, forming at least one plug of the materials being elevated at said position, and discharging substantially dry material at the top of the auger means.

2. The method of claim 1 wherein the step of removing the accumulated contaminants from the filter means includes brushing the outer surface of said filter means.

3. The method of claim 2 wherein the step of brushing the outer surface of said filter means comprises moving the surface thereof past a stationary brushing means.

4. The method of claim 1 further including adding a quantity of filter forming material to the liquid passed from the filtration system to facilitate accumulation of the contaminants and expended filter material by the filter means.

5. The method of claim 1 wherein the step of forming a plug of material during the upward conveying comprises forming a series of material plugs to filter a portion of the suspended solids from the liquid.

6. The method of claim 1 wherein the step of forming a plug of material during the upward conveying includes preventing liquid below the plug from rising to a level above the plug of material.

7. The method of claim 1 wherein the step of forming a plug of material during the upward conveying includes squeezing the plug of material to remove liquid therefrom.

8. The method of claim 5 wherein the step of forming a series of material plugs to filter a portion of the suspended solids from the liquid comprises filtering the suspended solids through the lowermost plug and squeezing the uppermost plug of material to remove liquid therefrom.

9. The method of claim 1 wherein the upward conveyance of said materials in said auger means is periodically interrupted to facilitate removal of liquid conveyed therein.

10. A method of removing and disposing of sludge from a filtration system containing unclarified liquid and expended filter material comprising the steps of withdrawing the contents of a filtration system through filter means carried within a desludger chamber clarifying the liquid withdrawn therefrom and discharging said liquid, adding a quantity of filter cake forming material to said discharged liquid, circulating said sludge bearing liquid and filter cake forming material through the filter means forming a filter cake thereon and clarifying the liquid passing therethrough by removing substantially all of the sludge from the liquid to the filter means, interrupting the withdrawal of liquid from the filtration system upon the clarification thereof, removing the filter cake formed on the filter means upon the interruption of withdrawing liquid from the filtration system, collecting the removed filter cake and conveying said filter cake from the desludger chamber to a vertically disposed auger means which is in direct communication with the desludger chamber, the filter cake entering the auger adjacent the bottom thereof, heating said filter cake in said auger means to vaporize at least a portion of the liquid in said filter cake, so that the remaining filter cake can be elevated by the auger means at relatively slow speeds of rotation of said auger means, a portion of the flight of the auger means being removed at least one position spaced from the bottom of the auger means, elevating the filter cake in said auger means while allowing liquid therein to drain by gravity, forming at least one plug of the filter cake being elevated at said position, and discharging substantially dry filter cake at the top of the auger means.

11. The method of claim 10 wherein the liquid clarified by withdrawing the contents of the filtration system through the filter means is discharged therefrom into a pre-coat feeder chamber for the addition of filter cake forming material.

12. Apparatus for removing and disposing of sludge from a filtration system containing unclarified liquid and expended filter material comprising means for passing the contents of a filtration system through a desludger chamber to remove the sludge contained therein thereby clarifying the liquid passed therethrough, filter means including hollow mesh filter elements having a filter cake supported thereby positioned within the desludger chamber to accumulate the sludge removed from the filtration system, means for interrupting the passing of the contents of the filtration system through the desludger chamber upon the clarification of the liquid and removal of the sludge contained therein, means for removing the filter cake bearing the sludge accumulation from said filter elements upon interruption of the passing of the contents of the filtration system, means for collecting the filter cake and conveying said filter cake from said desludger chamber to a vertically disposed auger means in direct communication with said desludger chamber, said means for collecting the filter cake and conveying said filter cake from said desludger chamber, conveying said filter cake to the auger means adjacent the bottom thereof, heating means in thermal contact with said auger means for vaporizing at least a portion of the liquid in said filter cake so that the auger means is capable of elevating the filter cake at a relatively slow speed of rotation, a portion of the flight of said auger means being removed at least one position spaced from the bottom thereof for forming a plug or filter cake at said position, means at the top of said auger means for discharging said filter cake.

13. The apparatus of claim 12, further including means for adding a predetermined quantity of filter cake forming material to said liquid to facilitate the accumulation of sludge by said filter means.

14. The apparatus of claim 13 wherein said means for adding a predetermined quantity of filter cake forming material comprises a container for holding a quantity of filter cake forming material, scraper means carried within said container and movable through the contents contained therein to prevent agglomerating of the filter cake forming material, and an auger rotatably carried within said container to remove a predetermined quantity of the filter cake forming material to response to the rotation thereof.

15. The apparatus of claim 12 wherein said filter elements comprise a plurality of coaxial hollow discs having an outer mesh surface forming a septum for support of a filter cake.

16. The apparatus of claim 12 wherein the means for removing the filter cake bearing the sludge accumulation comprise brush means positioned in contact therewith for mechanically separating the filter cake from the filter elements.

17. The apparatus of claim 12 wherein said heated vertical auger has a plurality of auger flight portions removed to form a series of accumulated sludge plugs.

18. The apparatus of claim 12 wherein said heated portion of said vertical auger extends at least from a point below the bottom outlet of said desludger chamber to at least a point above said desludger chamber.

19. The apparatus of claim 12 wherein said heated portion of said vertical auger extends upwardly at least from a point below the bottom outlet of the desludger chamber.

20. The apparatus of claim 12 wherein said heated vertical auger is enclosed by a plurality of selectively actuable heating means to control the temperature thereof.

21. The apparatus of claim 20 wherein said plurality of selectively actuable heating means comprise steam jackets.

22. The apparatus of claim 20 further including deflector means carried by said auger to remove the sludge therefrom.

23. The apparatus of claim 12 further including recovery means connected to said means for heating the conveyed filter cake to recover vapor formed upon removal of the liquid conveyed therewith.

24. The apparatus of claim 23 wherein said recovery means includes filtration apparatus for removing particulate material from the vapor.

25. The apparatus of claim 23 wherein said recovery means includes a condensor for changing the vapor into a condensate.

26. The apparatus of claim 25 wherein said recovery means further includes a liquid separation apparatus for separating immiscible liquids condensed from the vapor.

27. The apparatus of claim 12 wherein said conveyor means conveying said filter cake to the auger means adjacent the bottom thereof includes scraper means carried within said desludger chamber and movable through the contents contained therein to prevent filter cake from adhering to the desludger chamber.

28. The apparatus of claim 27 wherein said conveyor means includes a vertically disposed auger means within said desludger chamber.

29. The apparatus of claim 28 wherein said conveyor means includes a horizontally disposed auger means in direct communication with said vertically disposed auger means within said desludger chamber.

* * * * *